(No Model.) 2 Sheets—Sheet 2.

I. J. TRENCH.
POTATO DIGGER.

No. 434,263. Patented Aug. 12, 1890.

Witnesses:
Arthur P. L. Jenkins,
H. E. Bacharach.

Inventor,
Ira J. Trench,
by Simonds & Burdett,
attys

UNITED STATES PATENT OFFICE.

IRA J. TRENCH, OF MIDDLETOWN, CONNECTICUT, ASSIGNOR OF ONE-HALF TO CHARLES A. BOARDMAN, OF SAME PLACE.

POTATO-DIGGER.

SPECIFICATION forming part of Letters Patent No. 434,263, dated August 12, 1890.

Application filed February 5, 1890. Serial No. 339,250. (No model.)

*To all whom it may concern:*

Be it known that I, IRA J. TRENCH, of Middletown, in the county of Middlesex and State of Connecticut, have invented certain new and useful Improvements in Potato-Diggers, of which the following is a full, clear, and exact description, whereby any one skilled in the art can make and use the same.

The object of my invention is to provide a machine for digging potatoes that can be readily dragged over the ground and will ride clear of obstructions, will not clog, and will thoroughly separate the potatoes and the soil, and will work in light or heavy soil.

To this end my invention consists in the combination of the wheeled frame, the digger, and the cleaner, in details of the several parts making up the machine, and in their combination, as more particularly hereinafter described, and pointed out in the claims.

Figure 1:
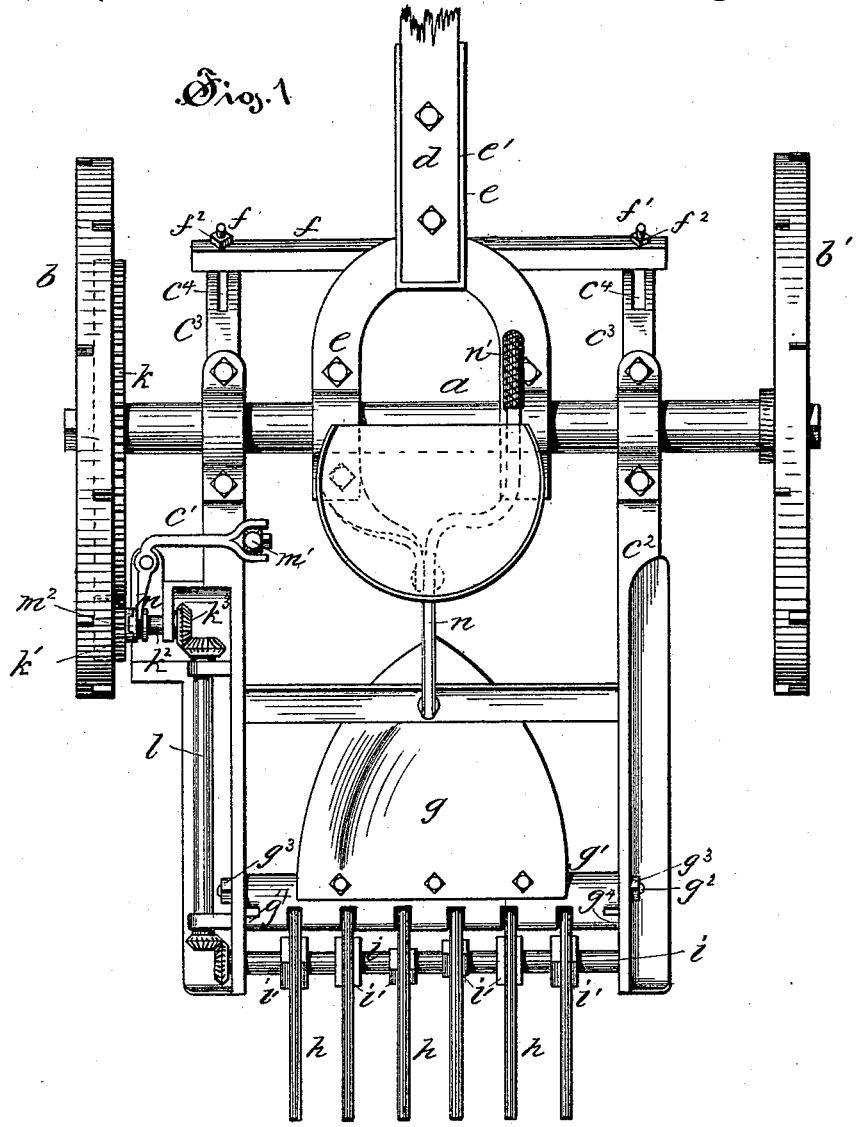
Figure 2:
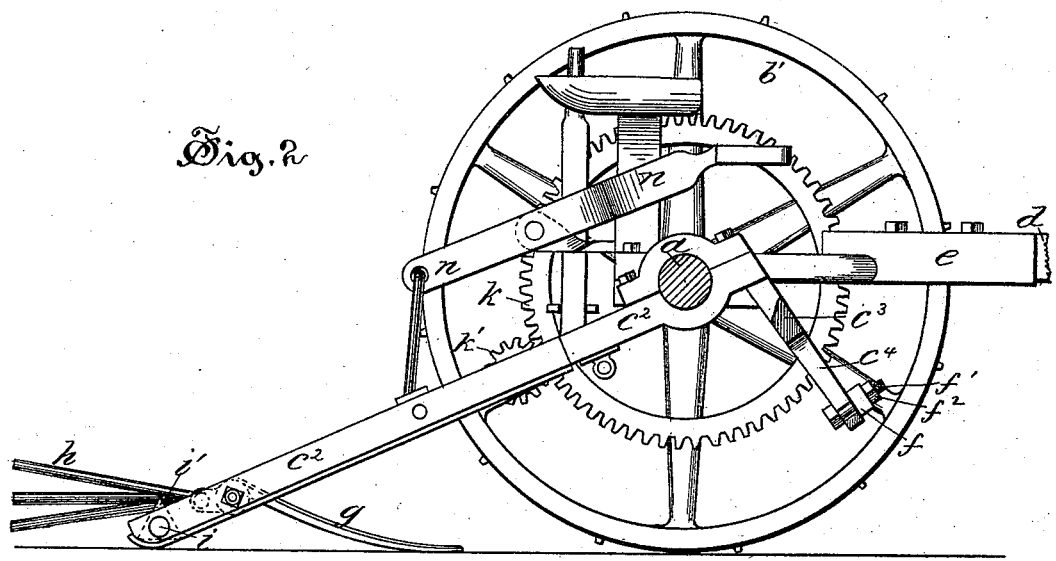
Figure 3:
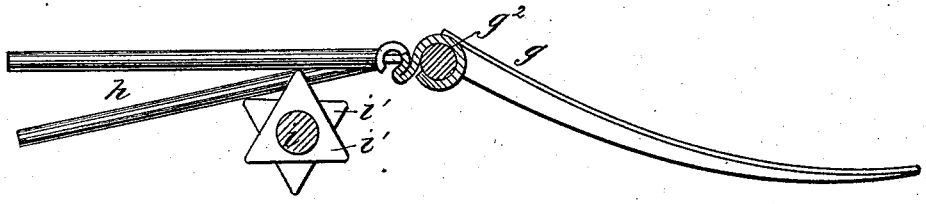
Figure 4:
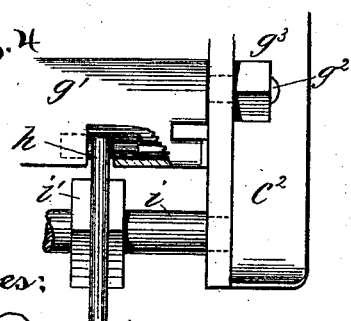
Figure 5:
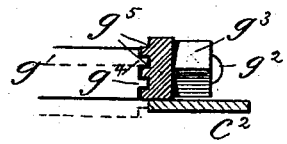

Referring to the drawings, Figure 1 is a top or plan view of a machine embodying my invention, with parts broken away to show construction. Fig. 2 is a detail side view of the machine, looking from the right of Fig. 1, with the wheel on that side removed. Fig. 3 is a detail view in section through the share and the cleaner at the rear of the frame. Fig. 4 is a detail plan view, on enlarged scale, of the rear end of the frame, showing the manner of attaching the share and the cleaner rods. Fig. 5 is a detail view in crosswise section on line $y\ y$ of Fig. 4.

In the accompanying drawings, the letter $a$ denotes an axle, on opposite ends of which are secured in the ordinary manner the wheels $b\ b'$. The frame $c$ is connected to the axle by its side parts $c'\ c''$, the axle being held between the clamping parts that may form journal-boxes for the axle to turn in, or the frame may be rigidly secured to the axle, so that the latter cannot rotate in the bearings in the frame. The neap or pole frame $e$, having a socket $e'$ for the removable pole $d$, is connected to the axle, preferably between the side parts of the frame, as shown in the drawings, and the latter may be so connected that the axle will turn freely therein, or is clamped rigidly thereto. It is important, however, that if the frame $c$ is secured to the axle, so that the latter cannot rotate in bearings therein, the pole-frame shall be mounted so that the axle will turn freely in the bearings therein. This is in order to allow the frame to be lifted off the ground in order to throw the machine out of operation in moving it along the roads and when it is desired not to use it for digging.

It is desirable that the line of draft in the machine should lie below the plane of the axle, and to this end the draft-bar $f$ is secured to the downturned arms $c^3$ of the frame. These arms may be located in front of the axle, as shown in the drawings, and the draft-bar that extends across the machine from side to side of the frame $c$ may be adjustably supported by the bolts $f'$, that pass through the bar and through slots $c^4$ in the arms, the head of the bolt lying on one side of the arm and the nut $f''$ on the outer side of the bar, so that the latter may be secured at any desired level below the plane of the axle within the extent of the slot in the arms of the frame.

The attaching points $f^3$ on the under side of the frame and back of the axle form another equivalent means of attaching the draft-bar or the tugs, differing, however, from the first-described method in that the draft on the latter causes the share $g$, that is secured to the rear cross-bar of the frame $c$, to keep its hold in the ground and prevents the wheels from lifting off the ground when a tough spot to dig in is encountered. In the latter case one resultant of the drawing force is directed vertically downward on the axle, whereas in the first-described location of the draft-bar (in front of the axle) the tendency in such case might be to lift the wheels from the ground and stop their rotation. As the operation of the cleaner-rods $h$ depends on the rotation of one of the wheels, the latter should always turn when the machine is moved forward, and it must be in contact with the ground in order to turn. The side parts $c'\ c''$ of the frame are preferably free from any upward-projecting parts near the rear end of the frame, that is smooth on the under side so that it can readily drag over the surface of the ground, and across the rear end of the frame extends a cross-bar $g'$, on which the share or digger $g$ is secured. This share extends forward and downward and is formed preferably with curved edges terminating at a point central of the digger, that acts as a shovel or scoop that enters the ground as the machine is moved forward, and lifts the dirt, mixed with the potatoes, and causes it to slide upward and backward across the share. Back of the share $g$, and preferably to the cross-bar $g'$, are secured a number of clearer-rods $h$. They may be attached to the rod-support in any desired manner. As shown in the drawings, the rod $h$ has a T-shaped head $h'$, and it is inserted in the socket by thrusting the end of the rod upward from below and then turning it forward, the rod being held in place within the limited vertical play by the walls of the socket. At a certain distance back of the point of pivotal support of the rods each one lies upon a cam $i'$, fast to a cam shaft $i$. These cams are equal in number to the rods and are fixed at different angles to the shaft, so as to provide for an alternate vertical play of the rods by the rotation of the cam-shaft.

The clearer driving mechanism consists of a cog-wheel $k$, fast to the wheel $b$, and in mesh with a smaller cog-wheel $k'$, borne on the shaft $k''$, supported in a bracket on the side part $c'$ of the frame. On the other end of this shaft $k''$ is a bevel-cog $k^3$, in mesh with a like bevel-cog on the end of the shaft $l$, that is mounted in bearings on the side part of the frame and extends lengthwise thereof. The rear end of this shaft $l$ has a bevel-cog that is in mesh with a bevel-cog on the end of the cam-shaft $i$. A rotary movement of the wheel $b$ obviously causes the intermediate parts to rotate and results in a rotary movement of the cam-shaft.

In order that the user of the machine may control the operation of the clearer mechanism, a clutch $m$ is mounted on the shaft $k''$, and its operation is controlled by the clutch-lever $m'$, the handle of which is located in a position of access at one side of the driver of the machine. A positive clutch of ordinary construction is shown in the drawings, the sliding collar $m''$ being splined to the shaft and having sockets into which projecting lugs on the side of the cog-wheel $k'$ may enter when the sleeve is thrown over into contact with the cog-wheel, as by means of the lever. The reverse movement of the lever disengages the clutch part and permits the cog-wheel $k'$ to turn freely on the shaft $k''$. Suitable covers may be provided for the working parts of the machine that are liable otherwise to become clogged with dirt.

In order to provide for the lifting of the share above the surface of the ground, a lever $n$ is pivoted to the pole-frame, on which the seat $o$ is mounted, one end of this lever lying in front of the axle and in convenient position for the foot-pad on it to be reached by the foot of the rider, and the other end being pivotally connected to a cross-bar on the frame $c$. The pole is secured to the draft-animals by the harness, and is thus held in a comparatively fixed plane, and when the machine is thus hitched up downward pressure upon the front end of the lever $n$ will cause the rear end of the frame $c$ to be lifted above the ground.

One feature of invention in the within-described machine resides in the clearway presented by the arrangement of the share across the rear end of the frame, which is thus free from any parts tending to collect the dirt and prevent it from flowing freely up the share and along over the cross-bar, and another feature is in the positive driving mechanism by which the cam-shaft is operated by the rotation of the main wheel of the machine. No injury to any one of the parts can be caused by the backing of the machine or by any forward movement when the driving mechanism for the clearer-rods is in operative engagement with the wheel.

The cross-bar $g'$ that supports the share $g$ is hinged or pivotally supported on the frame, so that the slope or angle of depression of the share may be adjusted. This is accomplished in the form of machine shown by mounting the bar $g'$ in a rod $g''$ that has threaded ends located outside the side parts of the frame, and by means of this rod and the nuts $g^3$ the cross-bar is clamped between the side parts of the frame. At any convenient distance from the rod the bar $g'$ has the lateral projections $g^4$ on its ends that are adapted to engage corresponding sockets $g^5$ in the side parts of the frame, Fig. 5. By loosening the nuts the side parts of the frame can be sprung apart and the end of the locking parts described released sufficiently to change the angle of the share, when the bar may be again clamped.

I claim as my invention—

1. In a potato-digger, in combination, the axle, the wheels mounted thereon, the frame pivotally supported on the axle and with rearward-extending side parts, the vertically-adjustable draft-attaching points on said frame, the pole-frame supported on the axle independently of the digger-frame, the cross-bar extending between the side parts of the digger-frame and supporting a share that projects forward and downward therefrom, the share, the swinging clearer-rods extending rearward from the cross-bar, and the clearer operating mechanism, all substantially as described.

2. In a machine of the within-described class, the frame pivotally supported on the axle near its front part, the axle having supporting-wheels, the downward-extending arms of the digger-frame projecting in front of the axle, the vertically-adjustable draft-bar extending between the arms, the cross-bar attached to the rear end of the frame and extending between the side parts, the bar-clamping device whereby the angular position of the share may be regulated, the share secured to the bar and extending forward therefrom, the vibrating clearer-rods pivotally attached to the cross-bar and extending rearwardly therefrom, and the within-described clearerrod-operating mechanism, all substantially as described.

3. In combination with the axle $a$, the wheels $b\ b'$, the digger-frame $c$, pivotally supported on the axle and having the downturned arms $c^3$ with lengthwise slots $c^4$, the draft-bar $f$, adjustably secured to the arms $c^3$, the pole-frame $e$, supported on the axle independent of the digger-frame $c$ and supporting a seat, the lever $n$, secured to the pole-frame and connected to a cross-bar on the digger-frame, whereby the horizontal position of the digger-frame may be adjusted, the cross-bar $g'$ with the share $g$ fast thereto and extending forward therefrom, the cross-bar having projecting pivots extending through the side parts of the frame and locking parts $g^4$ adapted to engage the locking-sockets $g^5$ in the frame, and clamp-nuts borne on the cross-bar pivots, the clearer-rods extending rearward of the cross-bar, and the clearer-rod-operating mechanism, all substantially as described.

4. In combination with an axle $a$, the wheels $b\ b'$, the cog-wheel $k$, secured to one of the wheels and in operative engagement with a cog-wheel $k'$, fast to the shaft $k''$, mounted in the frame $c$, the clutch device mounted on the shaft $k''$, the shaft $l$, with a bevel-cog in engagement with a cog on the shaft $k''$, and having on the opposite end a cog in engagement with a cog-wheel on the cam-shaft $i$, the frame $c$, consisting of the side parts $c'\ c''$, supported near its front end on the axle $a$, the cross-bar $g'$ with the share $g$ fast thereto and extending forward therefrom, the vibrating clearer-rods mounted on the cross-bar and resting upon the cams $i'$ on the cam-shaft $i$, the cam-shaft $i$ and the draft-attaching points secured to the frame below the plane of the axle, all substantially as described.

IRA J. TRENCH.

Witnesses:
   CHAS. L. BURDETT,
   W. B. JENKINS.